United States Patent [19]

van der Lely

[11] 4,053,019
[45] Oct. 11, 1977

[54] CULTIVATOR

[75] Inventor: Ary van der Lely, Maasland, Netherlands

[73] Assignee: C. van der Lely N. V., Maasland, Netherlands

[21] Appl. No.: 540,328

[22] Filed: Jan. 13, 1975

Related U.S. Application Data

[63] Continuation-in-part of Ser. No. 369,907, June 14, 1973, Pat. No. 3,885,633.

[30] Foreign Application Priority Data

Jan. 18, 1974 Netherlands .................. 7400686

[51] Int. Cl.² ........................................... A01B 33/06
[52] U.S. Cl. .................................. 172/59; 172/253; 172/776
[58] Field of Search .............. 172/68, 253, 59, 49, 172/57, 58, 60, 63, 240, 776

[56] References Cited

U.S. PATENT DOCUMENTS

| 2,651,246 | 9/1953 | Peters et al. | 172/59 |
| 2,654,198 | 10/1953 | Ryan | 172/253 |
| 3,202,221 | 8/1965 | Monk et al. | 172/63 |
| 3,511,318 | 5/1970 | Boetto et al. | 172/240 |
| 3,530,944 | 9/1970 | Spell | 172/59 |
| 3,638,539 | 2/1972 | Lewis | 172/59 X |
| 3,713,494 | 1/1973 | Berdrin | 172/59 |
| 3,821,989 | 7/1974 | van der Lely et al. | 172/59 |
| 3,885,633 | 5/1975 | van der Lely et al. | 172/68 |

Primary Examiner—George J. Marlo
Attorney, Agent, or Firm—Mason, Mason & Albright

[57] ABSTRACT

A cultivator is provided having a single supporting structure to which can be operatively connected one, or a pair, of a plurality of groups of rotary soil working members that include groups which preferably have at least two different working widths, whereby the cultivator may be used to work a strip of land having any chosen one of a number of different possible widths.

6 Claims, 6 Drawing Figures

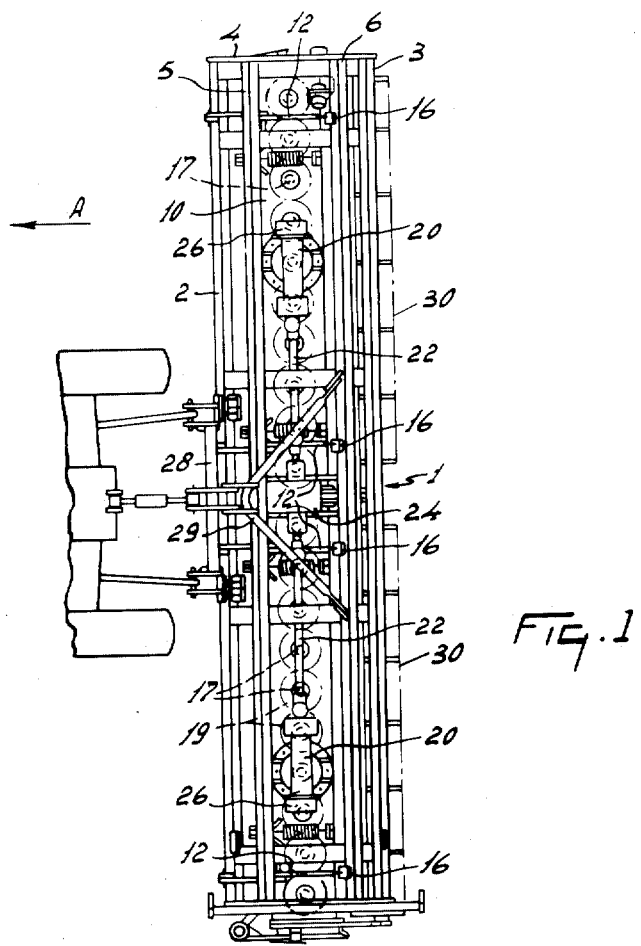

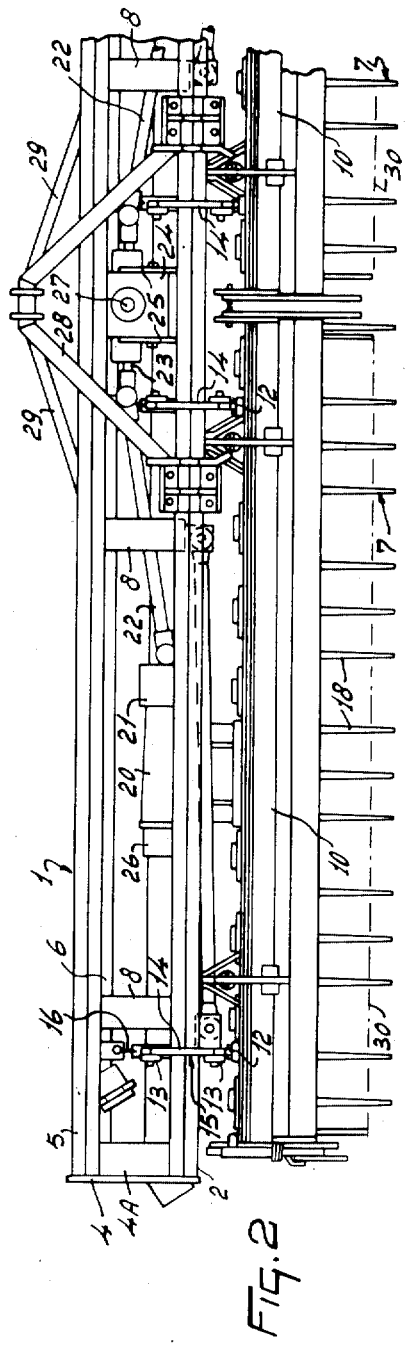
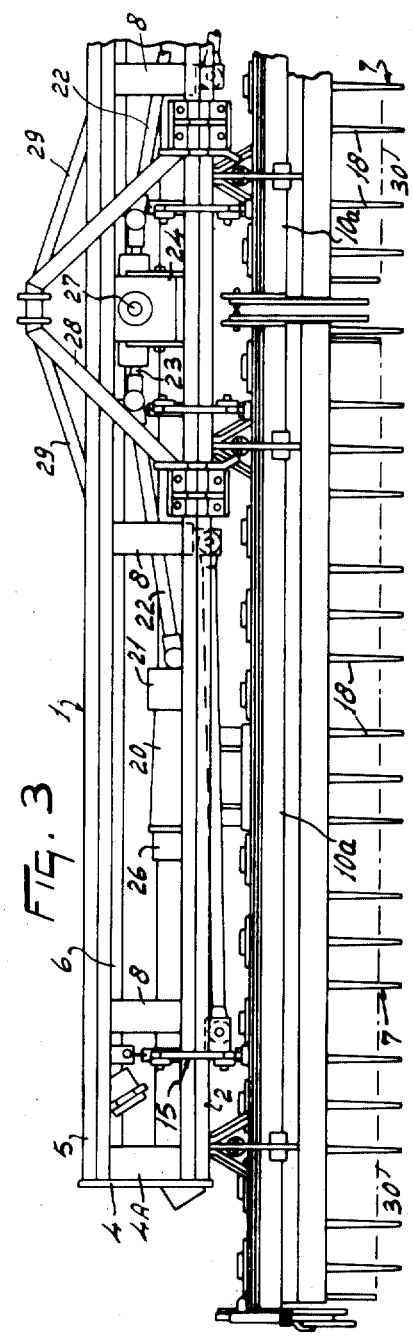

CULTIVATOR

This application is a continuation-in-part of Ser. No. 369,907, now U.S. Pat. No. 3,885,633 filed of June 14, 1973.

This invention relates to soil cultivating implements or cultivators, such as rotary harrows. An object of the invention is the provision of a cultivator of increased versatility as regards the possible working width thereof. Other objects of the invention will become apparent from a study of the description which is given below and from the accompanying drawings.

Figure 4:
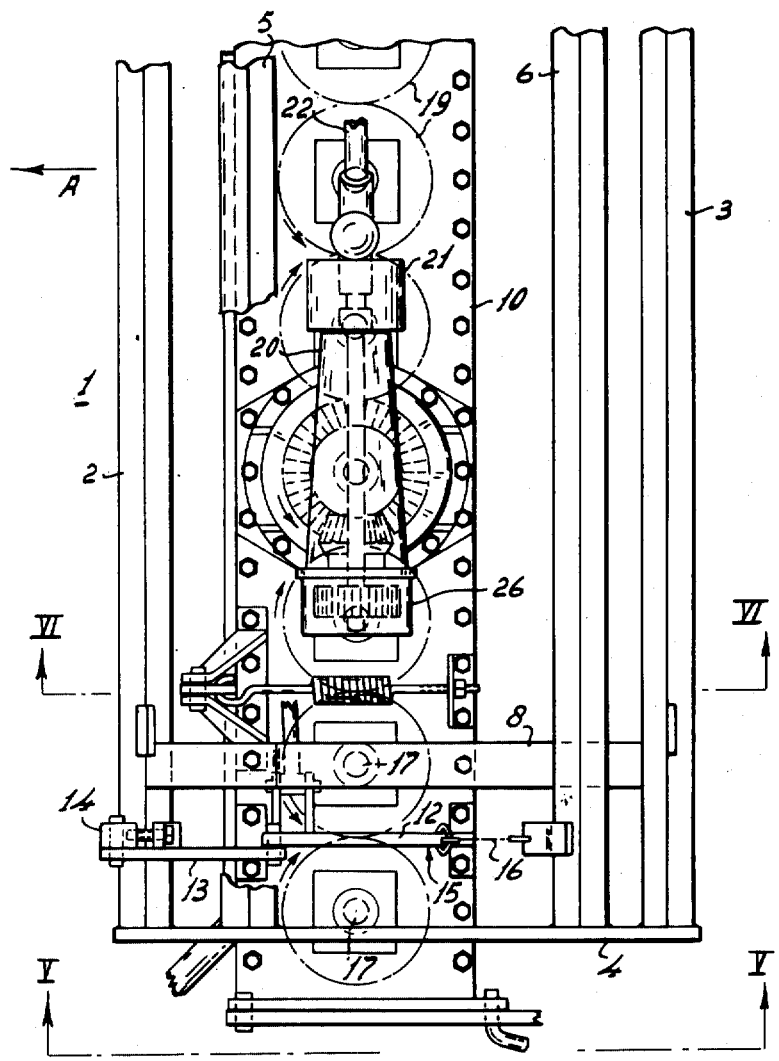

For a better understanding of the invention, and to show how the same may be carried into effect, reference will now be made, by way of example, to the accompanying drawings, in which:

FIG. 1 is a plan view of a rotary harrow in accordance with the invention connected to the rear of an agricultural tractor, FIG. 2 is a partial front elevation, to an enlarged scale, of the rotary harrow of FIG. 1, and FIG. 3 is a similar view to FIG. 2 but shows the harrow provided with two groups of soil working members that give the harrow a greater working width than when it is furnished with the groups thereof that are shown in FIGS. 1 and 2, and FIG. 4 is a plan view, in part, of the FIG. 1 harrow showing the transmission and frame connections.

Figure 5:
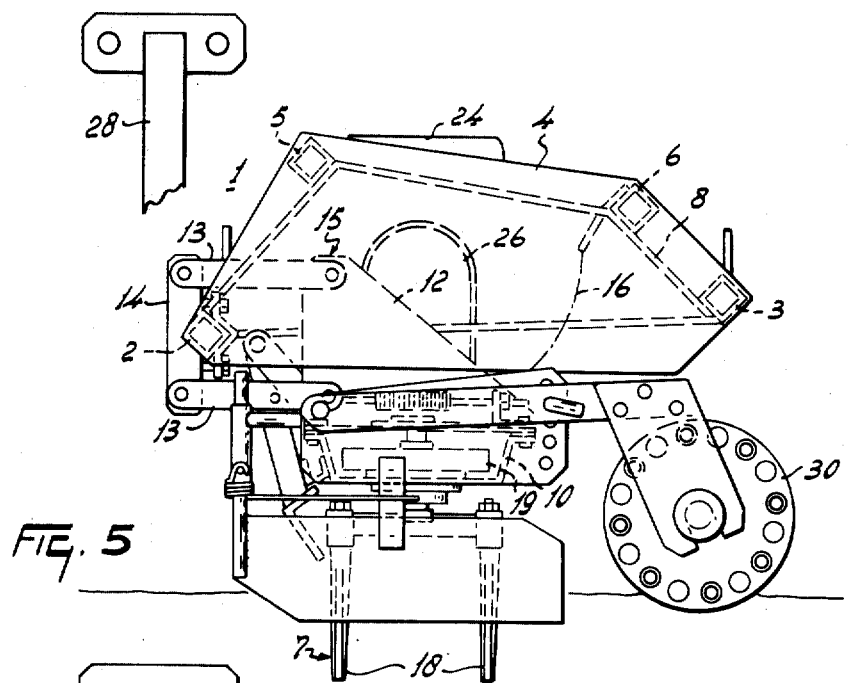
Figure 6:
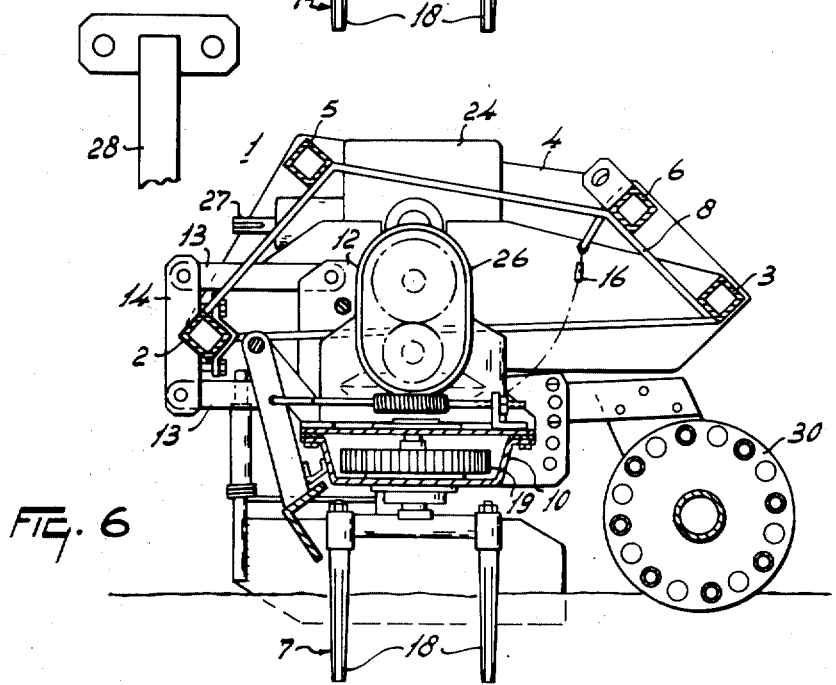

FIG. 5 is a side elevation of the harrow taken along the lines V — V of FIG. 4; and FIG. 6, is a side elevation of the harrow taken along the lines VI — VI of FIG. 4.

Referring to the drawings, the soil cultivating implement or cultivator that is illustrated in FIGS. 1 and 2 is substantially identical to that of FIGS. 1–6 of U.S. Pat. No. 3,885,633 and is in the form of a rotary harrow having a supporting structure that is generally indicated by the reference 1, said supporting structure comprising front and rear frame beams 2 and 3 that both extend substantially horizontally perpendicular to the intended direction of operative travel of the harrow which is indicated by an arrow A in FIG. 1 of the drawings, said frame beams 2 and 3 being spaced apart from one another in the direction A. Both the parallel frame beams 2 and 3 are of a polygonal cross-section which it is preferred should be a square one and, with this preferred construction, diagonals between the two opposite corners of the square cross-section of each beam extend substantially horizontally and substantially vertically, respectively. The front frame beam 2 is at a lower horizontal level than is the rear frame beam 3 and the corresponding ends of the two frame beams 2 and 3 are rigidly interconnected by vertical plates 4 that extend substantially parallel to the direction A. The surfaces of the two plates 4 which face each other are formed with large perpendicular rims 4A (FIGS. 2 and 3) which rims constitute supports for the opposite ends of two frame beams 5 and 6 which extend parallel to the frame beams 2 and 3 between the latter as seen in plan view (FIG. 1). The frame beams 5 and 6 have the same polygonal, and preferably square, cross-sections as do the frame beams 2 and 3, they have the same dispositions as the frame beams 2 and 3 when the preferred construction thereof is employed, and they are located at a higher horizontal level than are the frame beams 2 and 3. The leading frame beam 5 of the two beams 5 and 6 is at a higher horizontal level than is the rear frame beam 6 thereof and the distance between the beam 5 and the front frame beam 2 is greater than is the distance between the frame beam 6 and the rear beam 3. Supports which have rims 8 that are similar to the rims 4A are arranged at regular intervals along the lengths of the frame beams 2, 3, 5 and 6, said frame beams being rigidly secured to the rims 8 of those supports at the locations at which they adjoin them as seen in FIGS. 4–6.

Two substantially horizontally aligned frame portions 10 and 10a that are each of hollow box-shaped configuration are provided beneath the supporting structure 1 in substantially parallel relationship with the frame beams 2, 3, 5 and 6. Each frame portion 10 and 10a rotatably supports a corresponding group of soil working members each of which has soil working tines 18. The neighbouring ends of the two substantially aligned frame portions 10 and 10a are located close to one another in nearly adjoining relationship beneath a central region of the supporting structure 1 and the top of each frame portion 10 and 10a is provided at distances from both its opposite ends with two upright supports 12. The bottom of each upright support 12 extends throughout substantially the whole of the width of the corresponding frame portion, considered in a direction parallel to the direction A, whereas said support tapers upwardly from its bottom and has a substantially vertical leading edge. It is preferred that the bottoms of the supports 12 should be releasably fastened to the tops of the frame portions 10 and 10a by bolts which secure upper cover plates of the hollow frame portions 10 and 10c to their underlying bodies that are of substantially channel-shaped cross-section. There are a plurality of these bolts at substantially regular intervals around the superposed rims of the cover plates and underlying bodies and, with this arrangement, the supports 12 can be secured to the frame portions 10 and 10a at different distances from the opposite ends thereof merely by employing appropriately located bolts. The leading edge regions of the supports 12 have pairs of upper and lower arms 13 pivotably connected to them so as to be turnable about axes that are substantially parallel to the longitudinal axes of the frame portions 10 and 10a. The leading ends of the arms 13 are pivotably connected to brackets 14 that are carried by the front frame beam 2 and it can be seen in FIGS. 5 and 6 that each assembly which comprises an upright support 12, two arms 13 and a bracket 14 constitutes a pivotable parallelogram linkage 15 which will allow the corresponding frame portion to move upwardly and downwardly relative to the supporting structure 1 without significant tilting. The brackets 14 are preferably fastened to the frame beam 2 by clamps or the like in such a way that they can be loosened and slid lengthwise along the frame beam 2 to new positions in which they can be releasably retained by re-tightening the clamps as best seen in FIG. 4. Chains 16 interconnect the frame beam 6 and the upright supports 12 in such a way as to check the downward movements of the frame portions 10 that are possible relative to the supporting structure 1 as a result of the provision of the parallelogram linkages 15.

Each of the frame portions 10 and 10a accommodates a plurality of substantially vertical rotary shafts 17, those shafts being arranged in a single row in regularly spaced apart relationship and each of them being journalled in corresponding upper and lower bearings of the frame portion concerned. Each of the frame portions 10 and 10a that is furnished when the rotary harrow is assembled as illustrated in FIGS. 1 and 2 of the drawings has ten of the shafts 17 and those shafts are spaced apart from one another by distances which should not be more than 30 centimeters and which it is preferred should be substantially 25 centimeters. The upright longitudinal axis of each shaft 17 coincides with the axis of rotation of the corresponding underlying tined soil working member. Each soil working member comprises a substantially horizontal support that is not visible in the drawings but a central region of which is rigidly secured to the lowermost end of the corresponding shaft 17 that projects from beneath the frame portion 10 concerned. The opposite ends of each tine support carry substantially vertically extending cylindrical tine holders (also not visible in the drawings) in which upper fastening portions of the soil working tines 18 are rigidly, but releasably, secured. Active or soil working portions of the tines 18 are arranged in such a way that each of them is inclined to the vertical from top to bottom to a small extent so that it occupies a trailing position with respect to the intended direction of rotation of the soil working member of which it forms a part. The circular paths that are traced by the lowermost free ends or tips of the active or soil working portions of the tines 18 of immediately neighbouring soil working members of the harrow overlap one another during operation so that the harrow effectively produces a single broad strip of worked soil whose width is substantially equivalent to the width of the two frame portions 10 and 10a. Each shaft 17 is provided, inside the corresponding hollow frame portion, with a corresponding straight- or spur-toothed pinion 19 and, as will be evident from FIG. 1 of the drawings, the teeth of each pinion 19 in the single row of such pinions in each frame portion 10 and 10a are in mesh with those of the neighbouring pinion 19, or each of the neighbouring pinions 19, in that row.

The shaft 17 that corresponds to one of the center pair of the row of soil working members that corresponds to each of the two frame portions 10 and 10a has an upward extension into a corresponding gear box 20 that is mounted on top of the frame portion concerned. Each shaft extension carries a bevel pinion within the corresponding gear box 20 and that bevel pinion is in driven mesh with a further bevel pinion carried by a substantially horizontal shaft located within the same gear box. A further substantially horizontal shaft that is parallel to the shaft which has just been mentioned is also located in each gear box 20 and ends of those two parallel shafts project into a corresponding change-speed gear 26. It is not necessary to describe the change-speed gear 26 in detail but, briefly, it comprises a plurality of interchangeable and/or exchangeable toothed pinions that can be slipped onto splined or otherwise keyed ends of the two parallel shafts that have just been mentioned to produce any chosen one of a number of different transmission ratios between those shafts. A cover protects the pair of pinions that are in use within the change-speed gear 26 from contamination by dirt. One of the two parallel shafts that extend substantially horizontally through the gear box 20 is located at a higher level than the other and that upper shaft is connected by a slip clutch or other overloadshedding safety coupling 21 to an output shaft 23 of a central gear box 24 by way of an intermediate telescopic transmission shaft 22 having universal joints at its opposite ends. The gear box 24 is carried between two plates 25 that are mounted on the frame beams 2 and 3 so as to extend substantially parallel to the direction A, the output shaft 23 of the gear box extending substantially parallel to the beams 2, 3, 5 and 6.

The central gear box 24 has a substantially horizontal rotary input shaft 27 whose leading splined or otherwise keyed end projects forwardly from the gear box 24 in substantially the direction A. The shaft 27 carries, inside the gear box 24, a bevel pinion which drives the output shaft 23 and, as will be apparent from FIGS. 1 and 2 of the drawings, a second output shaft 23 which operates the soil working members of the frame portion 10 that is shown only in part in FIG. 2 of the drawings by way of transmission members that are substantially symmetrically identical to those that have been described above. The front frame beam 2 has a coupling member or trestle 28 detachably connected to it, said coupling member or trestle 28 being constructed and arranged for cooperation with the lifting links of a three-point lifting device or hitch carried by an agricultural tractor or other operating vehicle. A rear upper region of the coupling member or trestle 28 is rigidly but releasably secured to the frame beam 6 by integrally interconnected beams 29 that diverge rearwardly with respect to the direction A from said coupling member or trestle to said beam 6.

Each of the two frame portions 10 and 10c is provided at its opposite ends with arms that are turnable upwardly and downwardly alongside those ends about substantially horizontally aligned pivots that are located at the tops and fronts of the frame portions 10 with respect to the direction A. Means which are now shown in detail are provided to enable the arms to be retained in chosen angular settings about the substantially horizontal axes that are afforded by said pivots. The rearmost end of each arm with respect to the direction A is furnished with a substantially horizontal bearing and the two bearings that correspond to each frame portion 10 and 10a rotatably receive stub shafts at the end of a corresponding rotatable supporting member that is preferably, but not essentially, in the form of an open, substantially cylindrical, ground roller 30. It will be apparent that the level of the axis of rotation of each ground roller 30 that is chosen (by appropriately setting the corresponding arms) relative to the corresponding frame portion 10 and 10a is a principal factor in determining the depth of penetration of the tines 18 of the soil working members of that frame portion 10 into the ground.

In the use of the rotary harrow that has been described with reference to FIGS. 1 and 2 of the drawings, its coupling member or trestle 28 is connected to the three-point lifting device or hitch at the rear of an agricultural tractor or other operating vehicle and the rotary input shaft 27 of its central gear box 24 is placed in driven connection with the power take-off shaft of the same tractor or other operating vehicle. Upon applying rotary drive to the input shaft 27, the transmission members that extend between the gear box 24 and the two gear boxes 20 cause the shafts 17 and the soil working members which carry to rotate about the upright longitudinal axes of those shafts in directions which are such that each soil working member revolves in an opposite direction to its neighbour, or to each of its neighbours, in the single row thereof that corresponds to the same frame portion 10 or 10a. Speeds of rotation of the soil working members that are appropriate to the particular cultivating operation that is to be carried out can be chosen, without altering the input speed of rotation applied to the shaft 27, by employing corresponding transmission ratios between the two substantially horizontal parallel shafts in each gear box 20 with the aid of the interchangeable and/or exchangeable pinions of the two change-speed gears 26 as discussed above. It has previously been mentioned that the soil working members corresponding to each frame portion 10 or 10a work overlapping strips of soil to produce two corresponding broad strips of worked soil and it will be noted that the neighbouring ends of the two frame portions 10 or 10a are so close to one another that said two broad strips of worked soil substantially adjoin each other to produce substantially a single broad strip of worked land whose width is substantially equal to that of the path of travel of the harrow. Although both change-speed gears 26 will normally be adjusted to give the same transmission ratios between the parallel shafts in the gear boxes 20, this is not absolutely essential and operating conditions may be met with under which it is advantageous to set the two change-speed gears 26 to produce different transmission ratios. Since the two frame portions 10 and 10a and their corresponding soil working members are freely movable upwardly and downwardly relative to the supporting structure 1 independently of each other as a result of the provision of the parallelogram linkages 15, difficulties are not normally encountered in working somewhat undulating land. The harrow illustrated in FIGS. 1 and 2 of the drawings has a working width of substantially 5 meters (16 feet, 5 inches) and, even with somewhat undulating land, substantially uniform working of the soil is produced throughout that width. The two frame portions 10 and the corresponding groups of soil working members can readily be disconnected from the supporting structure 1 merely by uncoupling the transmission shafts 22 and unbolting the supports 12 from the tops of the frame portions. After their removal, the frame portions 10 and corresponding soil working members may be replaced by alternative frame portions 10a that comprise groups of soil working members which give a different working width. FIG. 3 of the drawings illustrates the replacement of the two frame portions 10 of FIGS. 1 and 2 by alternative frame portions 10a each of which comprises a group of twelve, rather than ten, soil working members with a correspondingly increased working width of the whole harrow. The parts on frame portions 10a are the same as those on portions 10 and have the same numbers. The detached supports 12 are re-connected to the tops of the replacement frame portions 10a merely by selecting appropriate bolts having regard to the arrangement which has been discussed above, the, or some of the, brackets 14 being loosened relative to the front frame beam 2 so that, where necessary, the brackets can be re-positioned along the beam 2 for correct registering of the supports 12 with fastening bolts on top of the replacement frame portions 10a. It should be noted that it is also possible temporarily to remove only one of the frame portions 10 and its group of soil working members and to use only the remaining group or to remove both frame portions 10 and their groups of soil working members and replace them by a single alternative frame portion 10a and corresponding group of soil working members that will give a different working width to the two original groups together or to one of those groups alone. With the construction and arrangement that has been described, it is possible for a rotary harrow or other soil cultivating implement or cultivator to have a single supporting structure but be capable of working a strip of land of any chosen one of a number of different possible widths. The versatility of employment is thus enlarged in a simple and effective manner as compared with known soil cultivating implements or cultivators that do not exhibit the features of this invention.

Although various features of the rotary harrow that has been described and that is illustrated in the accompanying drawings will be set forth in the following claims as inventive features, it is emphasised that the invention is not necessarily limited to those features and that it includes within its scope each of the parts of the rotary harrow that has been described and/or that is illustrated in the accompanying drawings both individually and in various combinations.

I claim:

1. A cultivator comprising an elongated supporting structure that has at least two substantially parallel beams extending transverse to the direction of travel, at least one hollow frame portion with a group of rotatable soil working members being connected to said structure and depending from the same, said soil working members being rotatably mounted on corresponding upwardly extending shafts that are positioned in a row and said shafts being journalled in said frame portion, said frame portion being elongated and extending transverse to the direction of travel, drive means housed within said frame portion and engaging said shafts, the shaft one of said soil working members having an extension that is connected to a first drive transmission, said first transmission being mounted on top of said frame portion and being interconnected to a second drive transmission on said supporting structure by a detachable drive shaft, said frame portion, together with said group of soil working members, and said first transmission being detachably connected to said supporting structure and drive shaft respectively, spaced apart supporting members detachably mounted on said hollow frame portion and said supporting members forming part of a parallelogram linkage that interconnects the frame portion to said supporting structure, said linkage comprising two spaced apart arms positioned one above the other that are pivotable upwardly and downwardly, the forward ends of said arms being connected to bracket means on said leading beam and the rearward ends of the arms being pivoted to said support members, said drive shaft and support members being detachable from said first transmission and frame portion and reconnectable to a further transmission and a further hollow frame portion that has corresponding soil working members, said corresponding soil working members having a working width that differs from the first mentioned group of soil working members.

2. A cultivator as claimed in claim 1, wherein there are two groups of soil working members and the frame portions of said two groups are detachably connected to said supporting structure in side-by-side relationship, the rotary soil working members of said two groups being arranged in a single row that extends substantially perpendicular to the normal direction of operative travel, each group having a corresponding first drive transmission that is connectable to said second drive transmission through said detachable drive shaft.

3. A cultivator as claimed in claim 1, wherein said spaced apart detachable supporting members are spaced inwardly from opposite lateral ends of said frame portion.

4. A cultivator as claimed in claim 1, wherein said second drive transmission is located substantially centrally on the said supporting structure.

5. A cultivator as claimed in claim 1, wherein said first drive transmission for a group of soil working members includes a corresponding change-speed gear.

6. A cultivator as claimed in claim 1, wherein said detachable supporting members are releasably bolted to the top of said frame portion.

* * * * *